(12) United States Patent
Kinsey et al.

(10) Patent No.: US 8,157,203 B2
(45) Date of Patent: Apr. 17, 2012

(54) METHODS AND APPARATUS FOR TRANSFORMING UNMANNED AERIAL VEHICLE

(75) Inventors: Lloyd E. Kinsey, Tucson, AZ (US); Patrick Kranking, Marana, AZ (US)

(73) Assignee: Raytheon Company, Waltham, MA (US)

(*) Notice: Subject to any disclaimer, the term of this patent is extended or adjusted under 35 U.S.C. 154(b) by 818 days.

(21) Appl. No.: 12/262,747

(22) Filed: Oct. 31, 2008

(65) Prior Publication Data
US 2010/0025543 A1 Feb. 4, 2010

Related U.S. Application Data

(60) Provisional application No. 60/985,132, filed on Nov. 2, 2007.

(51) Int. Cl.
*B64C 27/22* (2006.01)
(52) U.S. Cl. ............. 244/7 A; 244/7 R; 244/17.23
(58) Field of Classification Search ............ 244/7 A, 244/7 R, 17.23, 6, 17.25
See application file for complete search history.

(56) References Cited

U.S. PATENT DOCUMENTS

| | | | |
|---|---|---|---|
| 2,397,632 A * | 4/1946 | Stuart | 244/7 B |
| 2,750,133 A * | 6/1956 | Lebold | 244/100 R |
| 3,025,022 A | 3/1962 | Girard | |
| 3,142,455 A * | 7/1964 | Wilford | 244/7 B |
| 3,149,803 A * | 9/1964 | Petrides et al. | 244/17.13 |
| 3,884,431 A * | 5/1975 | Burrell | 244/7 A |
| 4,123,020 A * | 10/1978 | Korsak | 244/116 |
| 5,289,994 A * | 3/1994 | Del Campo Aguilera | 244/7 B |
| 5,765,783 A | 6/1998 | Albion | |
| 5,799,900 A | 9/1998 | McDonnell | |
| 6,561,455 B2 * | 5/2003 | Capanna | 244/7 R |
| 6,845,939 B1 * | 1/2005 | Baldwin | 244/7 R |
| 7,789,341 B2 * | 9/2010 | Arlton et al. | 244/17.23 |

FOREIGN PATENT DOCUMENTS

FR 1225791 A 7/1960

* cited by examiner

*Primary Examiner* — Christopher P Ellis
(74) *Attorney, Agent, or Firm* — Renner, Otto, Boisselle & Sklar, LLP

(57) ABSTRACT

Methods and apparatus for a transforming aerial vehicle according to various aspects of the present invention may operate in conjunction with a launch system configured to rotate the aerial vehicle about its longitudinal axis. A lifting surface pivotally connected to the aerial vehicle may be positioned such that the rotation of the aerial vehicle causes the lifting surface to generate a lifting force on the aerial vehicle. This lift causes the aerial vehicle to rise gyroscopically before the lifting surface is rotated to a second position such that the aerial vehicle transforms from a gyroscopic mode to a fixed-wing aerial vehicle. The lifting surface may then be rotated again to allow the aerial vehicle to land as an auto gyro.

13 Claims, 8 Drawing Sheets

METHODS AND APPARATUS FOR TRANSFORMING UNMANNED AERIAL VEHICLE

CROSS-REFERENCES TO RELATED APPLICATIONS

This application claims the benefit of U.S. Provisional Patent Application No. 60/985,132 filed Nov. 2, 2007, and incorporates the disclosure of the application by reference.

BACKGROUND OF INVENTION

Unmanned aerial vehicles (UAVs) have become an alternative to manned aircraft in various military and law enforcement applications. Unmanned aerial vehicles eliminate many risks to crew and may be more varied in design, size, and weight than traditional manned aircraft. UAVs may also operate in areas where manned aircraft may not. For example, use of UAVs to perform reconnaissance and engagement missions is increasing as the technology matures. Rapid deployment of UAVs in a variety of situations allows for faster, and often less observable, intelligence gathering. UAVs may also be used by ground forces to gather surveillance information on a target prior to engagement with human or other high value assets.

UAVs may be launched by a variety of systems, including conventional taxiing, vertical lifting off, launching by hand, and ejecting from mechanical or pneumatic systems. Some of these techniques are more advantageous than others in a given environment, such as in confined geographic areas or urban canyons. Aircraft that can take-off in a completely or substantially vertical manner allow for use in areas where runways are nonexistent, but their flight performance may be limited as a result of their design.

SUMMARY OF THE INVENTION

Methods and apparatus for a transforming aerial vehicle according to various aspects of the present invention may operate in conjunction with a launch system configured to rotate the aerial vehicle about its longitudinal axis. A lifting surface pivotally connected to the aerial vehicle may be positioned such that the rotation of the aerial vehicle causes the lifting surface to generate a lifting force on the aerial vehicle. This lift causes the aerial vehicle to rise gyroscopically before the lifting surface is rotated to a second position such that the aerial vehicle transforms from a gyroscopic mode to a fixed-wing aerial vehicle. The lifting surface may then be rotated again to allow the aerial vehicle to land as an auto gyro.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various lifting surfaces, structures, propulsion systems, and the like, which may carry out a variety of functions. In addition, the present invention may be practiced in conjunction with any number of aerial vehicles, such as unmanned aerial vehicles, gyroplanes, or surveillance systems, and the systems described are merely exemplary applications for the invention. Further, the present invention may employ any number of conventional techniques for launching and retrieving unmanned aerial vehicles.

Figure 1:
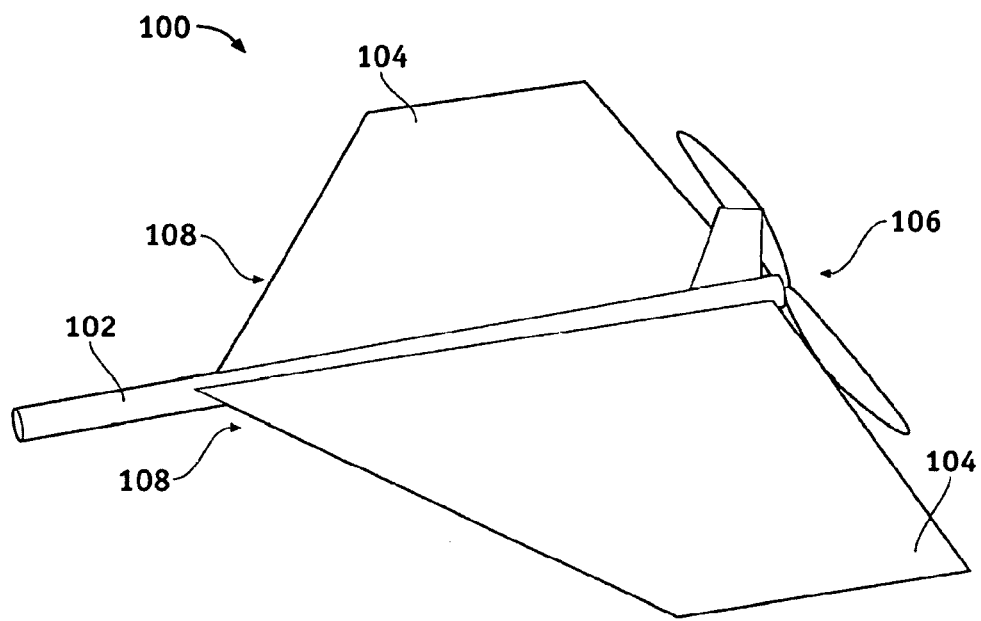
FIG. 1 representatively illustrates an unmanned aerial vehicle in accordance with an exemplary embodiment of the present invention.

Various representative implementations of the present invention may be applied to systems for launching, guiding, and/or retrieving aerial vehicles. Certain representative implementations may include, for example, systems for launching unmanned aerial vehicles in restricted locations. Referring now to FIG. 1, methods and apparatus for a transforming unmanned aerial vehicle according to various aspects of the present invention may operate in conjunction with an aircraft, such as an unmanned aerial vehicle (UAV) 100. The UAV 100 may comprise a body 102 connected to one or more lifting surfaces 104. The UAV 100 may further comprise a propulsion system 106, which may provide propulsion during flight and/or takeoff and landing.

The UAV 100 may be configured for multiple flight modes, such as vertical take-off and landing (VTOL) mode and fixed-wing flight mode. For example, during take-off and/or landing, the UAV 100 may comprise a VTOL aircraft configured to control altitude by spinning the body 102 about its longitudinal axis as opposed to using vectored thrust or a spinning rotor. During other stages of flight, the UAV 100 may fly as a more traditional fixed-wing aircraft with a propulsion system configured to accelerate the UAV 100 forward. Thus, the UAV 100 may fly as a conventional fixed-wing aircraft and take off and/or land as a gyrocopter or autogiro.

The body 102 comprises a main structure for the UAV 100 and/or carries internal components of the UAV 100. The body 102 may comprise any system suitably configured to connect or house the individual components of the UAV 100, such as a tube, a hull, a fuselage, and the like. The body 102 may comprise an aerodynamic body or be a component of a larger lifting body configuration, such as a flying wing. For example, the body 102 may comprise a monocoque or semi-monocoque fuselage configured to house a payload and attach to a propulsion system. The body 102 may further comprise any suitable structure for the attachment of at least one lifting surface 104. The body 102 may comprise any suitable material such as wood, fiberglass, metal, composite material and/or fabric. The body 102 may also comprise any suitable length, width, or volume. For example, in one embodiment, the body 102 may be several feet long and be configured to carry multiple types of surveillance systems, warheads, weapons, communication systems, navigational and guidance systems, and/or sensors, while in another embodiment, the body 102 may be less than one foot in length and be configured to carry a smaller payload, such as micro-video camera.

Figure 2:
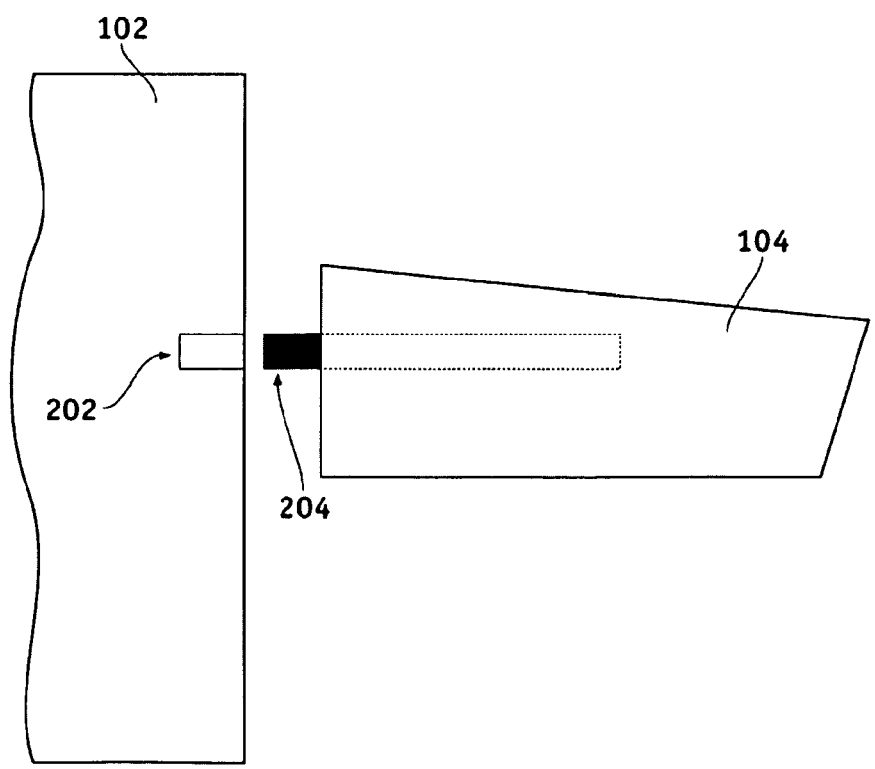
FIG. 2 representatively illustrates a lifting surface to fuselage connection point.

Referring now to FIG. 2, the body 102 may further comprise a pivotal attachment point 202 for each lifting surface 104. The pivotal attachment point 202 connects the lifting surface 104 to the body 102 and provides a point of rotation about which the lifting surface 104 may rotate. The pivotal attachment point 202 may comprise any suitable system for allowing the lifting surface 104 to rotate in relation to the body 102. For example, the pivotal attachment point 202 may securely couple a wing component, such as a wing spar 204, to the body 102.

Figure 3A:
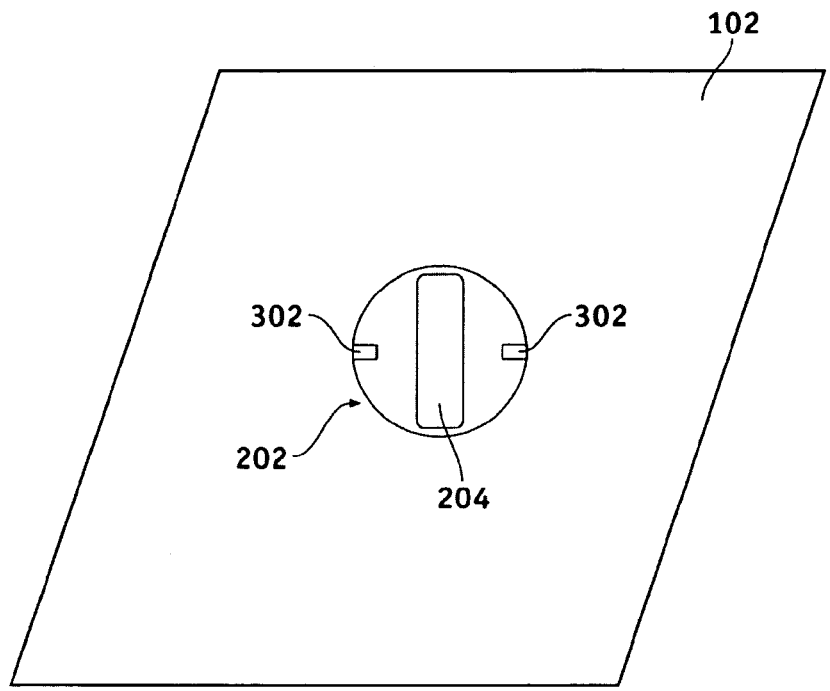
FIG. 3A representatively illustrates a cross-sectional view of a lifting surface pivotal connection in forward flight position.
Figure 3B:
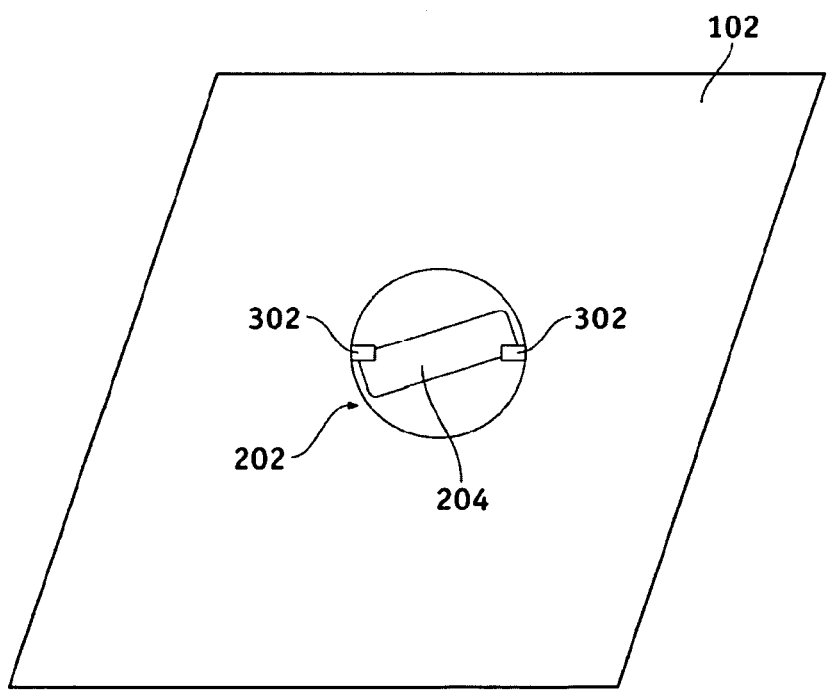
FIG. 3B representatively illustrates a cross-sectional view of the lifting surface pivotal connection in vertical flight position.

The pivotal attachment point 202 may rotate the lifting surface 104 by any suitable mechanism, such as a motor, a pulley system, one or more springs, or a screw. The pivotal attachment point 202 may further allow the lifting surface to rotate by any suitable amount. For example, referring to FIGS. 3A and 3B, mechanical stops 302 may be used to limit the amount of rotation of the lifting surface 104 in any given direction. In one embodiment, the pivotal attachment point 202 may allow rotation in only a single direction and limit total rotation to less than ninety degrees relative to the body 102. In another embodiment, the pivotal rotation point 202 may comprise a mechanical system configured to allow precise rotation of a lifting surface such that it may form an angle of between thirty and one hundred fifty degrees relative to the longitudinal axis of the body 102. In yet another embodiment, the pivotal attachment point 202 may be configured to position the lifting surface 104 at any suitable angle of attack for a desired flight condition or flight mode.

Figure 4:
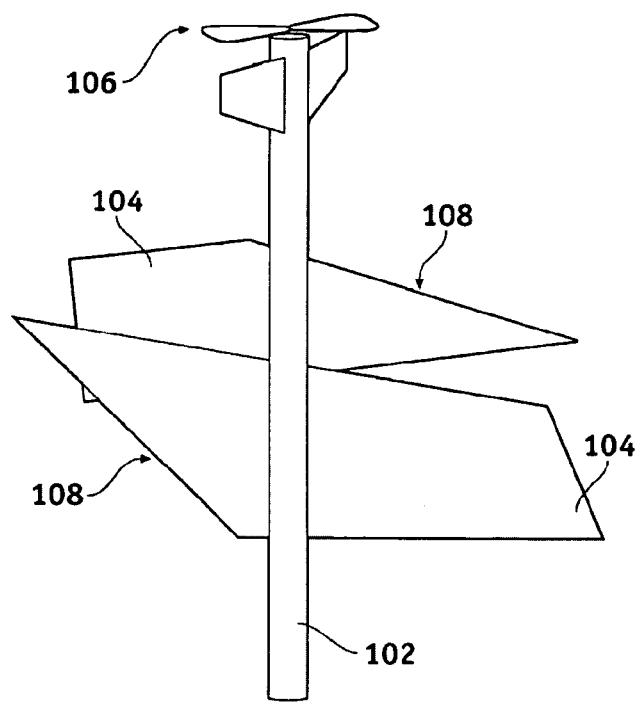
FIG. 4 representatively illustrates the lifting surfaces positioned in gyro mode for launch.

Referring now to FIG. 4, during launch and/or landing of the UAV 100, the pivotal attachment point 202 may be configured to allow a first and second lifting surface 104 to rotate clockwise relative to the body 102 such that the two lifting surfaces 104 rotate in substantially opposite directions from each other when the UAV 100 is viewed by an observer during rotation of the lifting surfaces 104. The result of this opposite rotation places a leading edge 108 of each lifting surface 104 in a direction that is substantially opposite to that of the other. In an alternative embodiment, the pivotal attachment point 202 may be configured to allow the lifting surfaces 104 to rotate in the same direction when viewed by an aboserver.

The lifting surface 104 provides a lifting force to the body 102. The lifting surface 104 may comprise any suitable system for providing lift, such as a wing or a rotor. The lifting surface 104 may comprise any suitable shape or size and may, in conjunction with a second lifting surface 104, form any suitable configuration. In one embodiment, the lifting surface 104 may comprise an airfoil. In another embodiment, two lifting surfaces 104 may be combined to form a delta wing or other similar high lift design. In a third embodiment, the lifting surface 104 may comprise a flat plate.

The lifting surface 104 may comprise any suitable structural components such as spars and ribs. Alternatively, the lifting surface 104 may be void of any internal structure and instead comprise a hollow surface, such as a molded graphite shell. The lifting 104 surface may also comprise any suitable materials, such as wood, foam, metal, fabric, fiberglass, or other composite material. The lifting surface 104 may have a rigid outer skin or comprise a fabric material stretched over an inner structure. The lifting surface 104 may also be of a fixed shape or it may change shape. For example, during forward flight, the lifting surface 104 may be configured as a traditional airfoil, but during take-off and/or landing, the lifting surface 104 may be altered such that the upper camber shifts across the chord line to maintain equal lift between multiple lifting surfaces 104. In addition, the lifting surfaces 104 may selectively detachable in flight, for example to convert the UAV 100 into a guided or unguided bomb. For example, the UAV 100 may carry a warhead and/or penetrator, and may be adapted to fly to a target, position itself for a ballistic trajectory to intercept the target, and then jettison the lifting surfaces 104. Without the lifting surfaces 104, the body 102 and the accompanying payload may ballistically travel to the target to deliver the payload.

The propulsion system 106 provides a propulsive force to the UAV 100. The propulsion system 106 may comprise any suitable system for accelerating the UAV 100, such as an engine- or motor-driven propeller, a turbofan, a jet, or a micro-engine. The propulsion system 106 may be adapted to operate off of any suitable power source, such as batteries, fuels, hybrid technology, solar, or fuel cells.

Figure 6A:
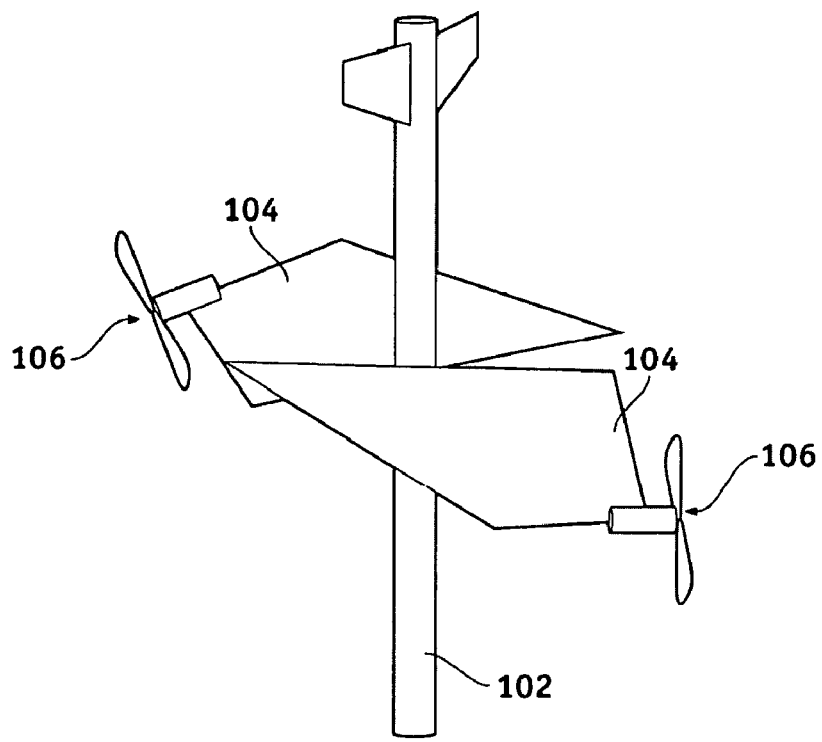
FIG. 6A representatively illustrates a propulsion system configured to control the rate of spin.
Figure 6B:
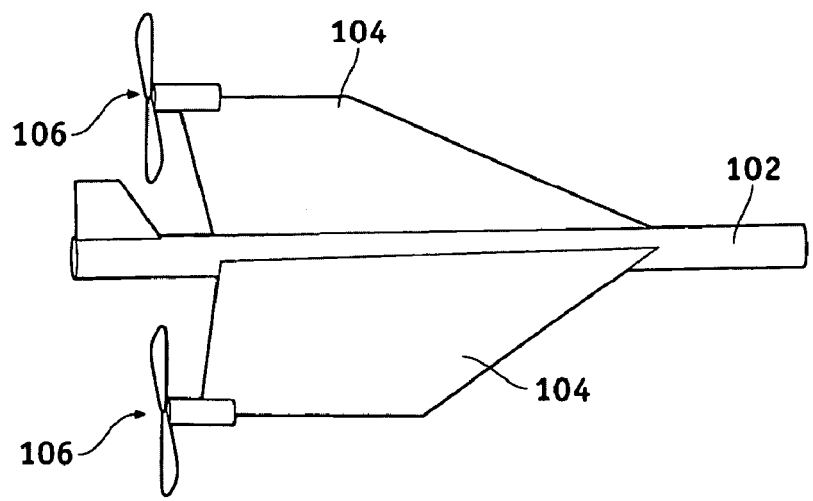
FIG. 6B representatively illustrates the propulsion system shown in FIG. 6A with lifting surfaces positioned in fixed-wing mode.

The propulsion system 106 may also be configured in any suitable manner to propel the UAV 100. In one embodiment, the propulsion system 106 may comprise a single propeller-driven system attached to one end of the UAV 100. For example, referring to FIG. 1, the propulsion system may comprise a propeller attached to the aft end of the UAV 100 in a pusher configuration. In another embodiment, the propulsion system 106 may comprise multiple elements affixed to the lifting surfaces 104. Referring now to FIGS. 6A and 6B, attachment of the propulsion system 106 to each of the lifting surfaces 104 may allow the propulsion system 106 perform multiple functions. For example, during take-off and/or landing, the propulsion system 106 may at least partially control the rate of spin of the body 102, affecting the amount of lift generated and at least partially controlling the UAV's 100 rate of ascent or descent. During fixed-wing flight, the propulsion system 106 may be the primary propulsive force for the UAV 100, but may also additionally at least partially control flight characteristics, such as yaw.

The body 102 may also comprise a control system or other electronic assembly. The control system may be internal to the body 102 or it may be disposed at least partially external to the body 102. The control system may comprise any suitable system for controlling the UAV 100, such as a flight control computer, a system configurator, a guidance system, a communication system, or any combination of the like. The control system may also adjust the rotation of the lifting surface 104 in relation to the pivotal attachment point 202, such as during transitional periods between modes of operation, during fixed-wing flight, and/or during take-off and landing.

For example, referring to FIG. 4, to launch the UAV 100, two lifting surfaces 104 may be rotated to a position where they generate lift while rotating about the body 20. For example, the control system may rotate the lifting surfaces 104 such that their respective leading edges 108 are set at some angle above the horizon so that spinning the body 102 around its longitudinal axis generates lift and the UAV 100 gains elevation in a substantially vertical manner. Then, at some later point, the control system may cause a propulsion system to engage while also signaling the lifting surfaces 104 to rotate such that their leading edges 108 face the same direction, allowing the UAV 100 to transition into fixed-wing forward flight.

Figure 5:
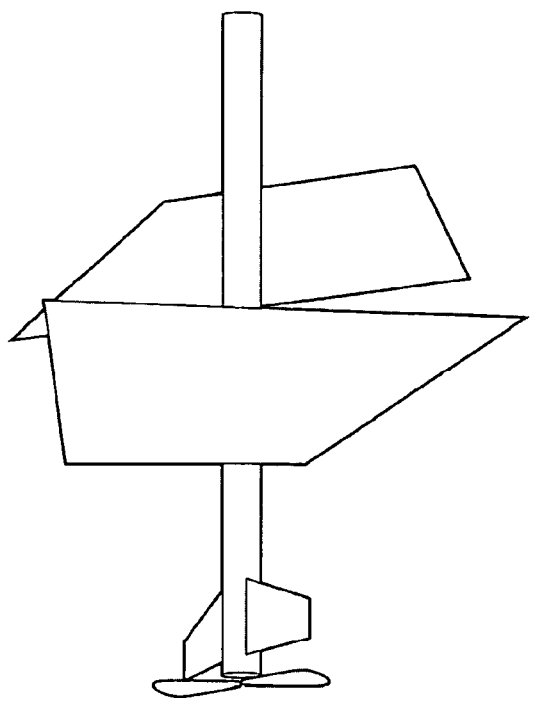
FIG. 5 representatively illustrates the lifting surfaces configured in autogiro mode.

The control system may also be suitably adapted to adjust the rotation of the lifting surfaces 104 during landing so as to control the rate of descent of the UAV 100. For example, referring to FIG. 5 of one embodiment, the control system may initiate a landing sequence by first pitching the UAV 100 upwards while simultaneously placing the UAV 100 into a roll that begins the body 102 spinning about its longitudinal axis. This increased angle of attack may cause the UAV 100 to stall and enter into a tail slide. The control system may signal the lifting surfaces 104 to rotate in a direction where the leading edges 108 are below the horizon such that lift is produced both by the spinning UAV 100 and the downward motion of the UAV 100 caused by the tail slide. Thus, the rate of descent may be controlled in a manner much like an auto gyro.

Figure 7:
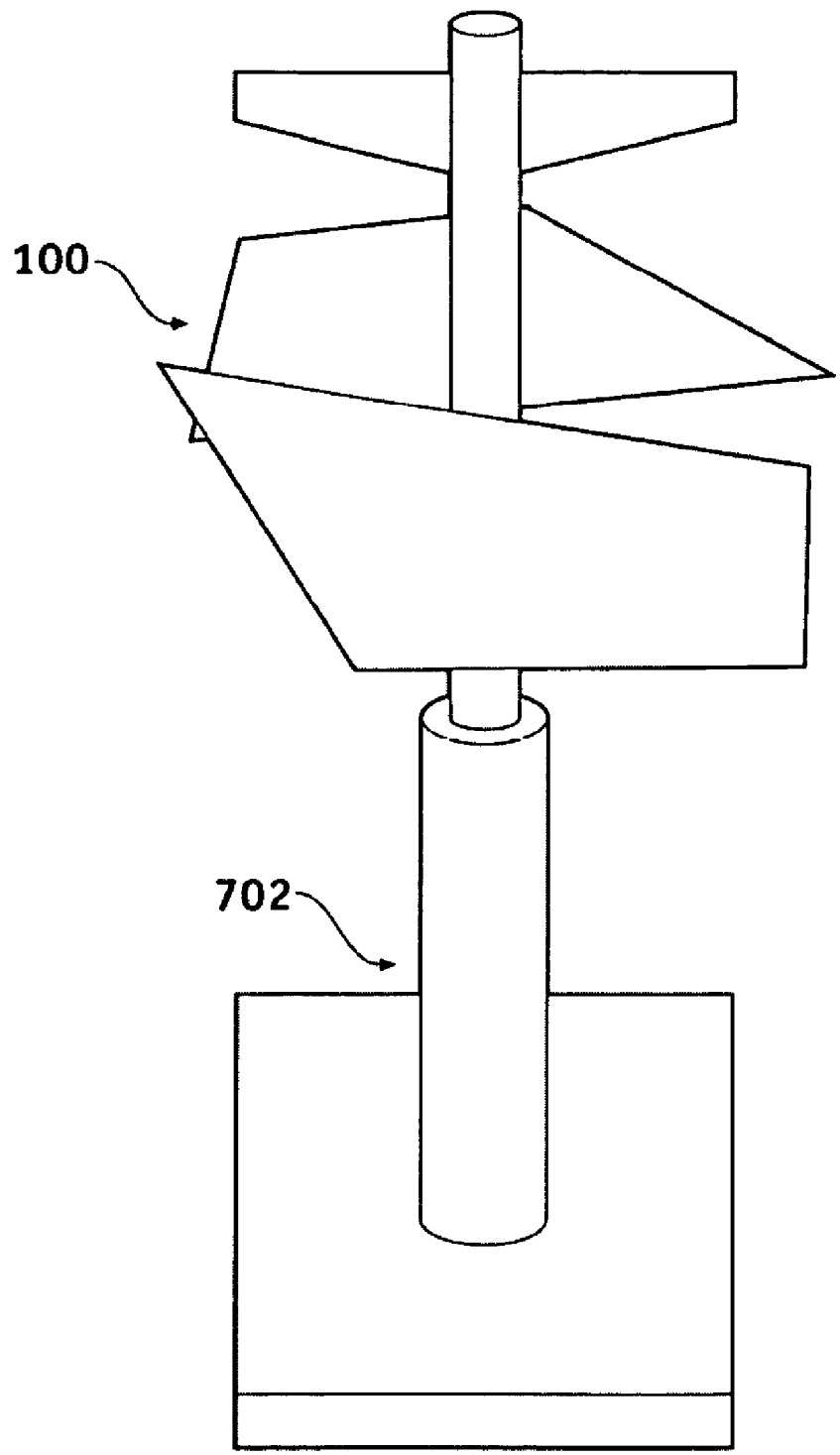
FIG. 7 representatively illustrates a launch mechanism containing an unmanned aerial vehicle configured in gyro mode.

Referring now to FIG. 7, a launch system 702 may spin the body 102 of the UAV 100. The launch system 702 may comprise any suitable system for causing the body 102 to rotate at a given velocity or rate of acceleration such that the lifting surface 104 generates lift. For example, as the body 102 is spun at an increasing number of revolutions per second, the effective airspeed over the lifting surface 104 increases, resulting in a greater amount of lift generated by the lifting surface 104. Once the amount of generated lift exceeds the weight of the UAV 100, the UAV 100 begins to ascend in a generally vertical manner.

The launch system 702 may be powered by any suitable system, such as pneumatically or by an engine, motor, or flywheel. The launch system 702 may also be configured for independent operation or may be coupled to a mobile entity, such as a motorized land vehicle.

The launch system 702 may be configured to engage the UAV 100 in any suitable manner. For example, in one embodiment, the launch system 702 may comprise a vertical tube configured to receive the forward end of the UAV 100. The launch system 702 may couple tightly to the nose of the UAV 100 or engage an adapter system on the surface of the UAV 100. The launch system 702 may further release the UAV 100 after a threshold event, such as achieving a predetermined rate of spin or amount of lift or following an elapsed period of time.

Figure 8:
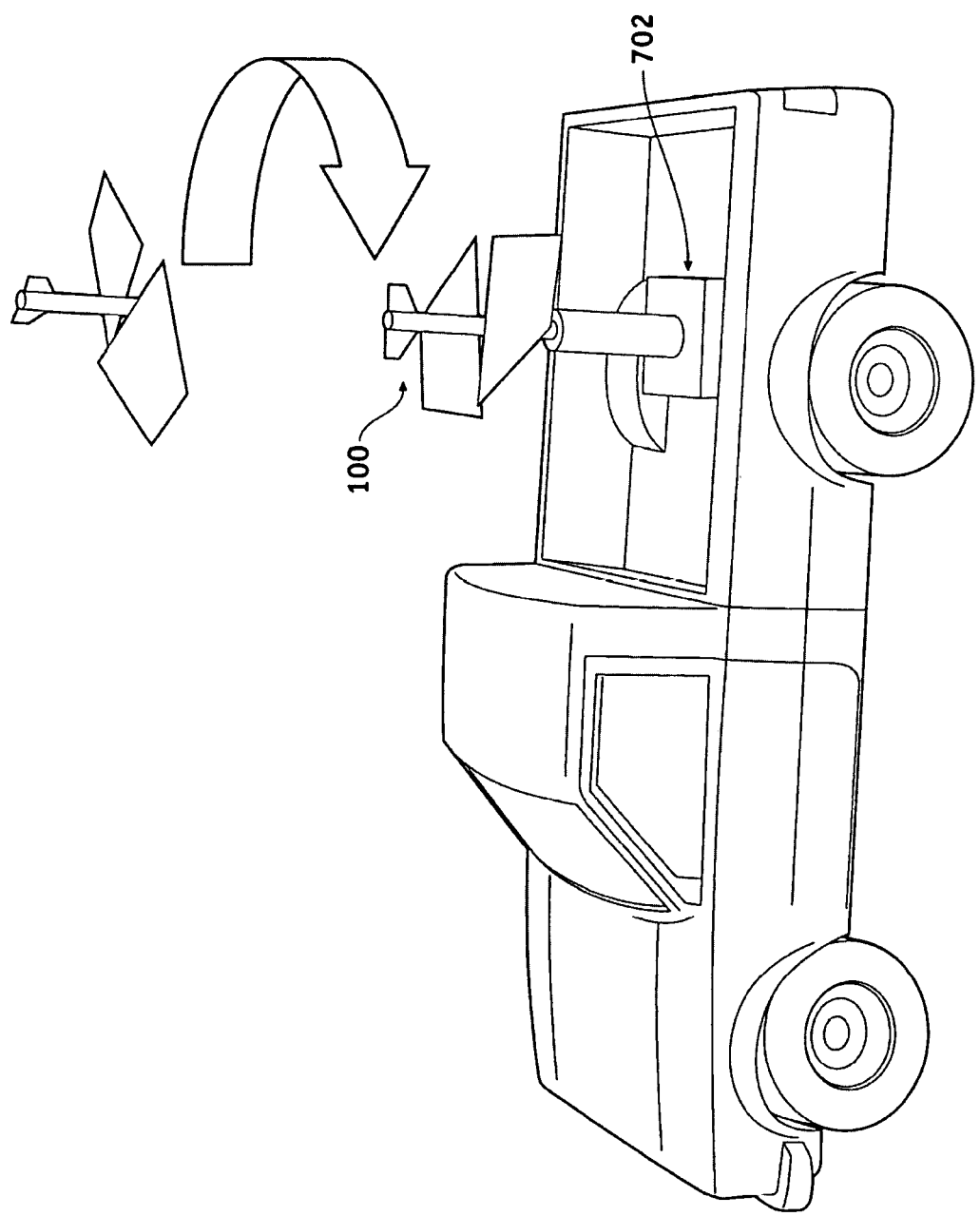
FIG. 8 representatively illustrates a mobile launch platform.
Figure 9:
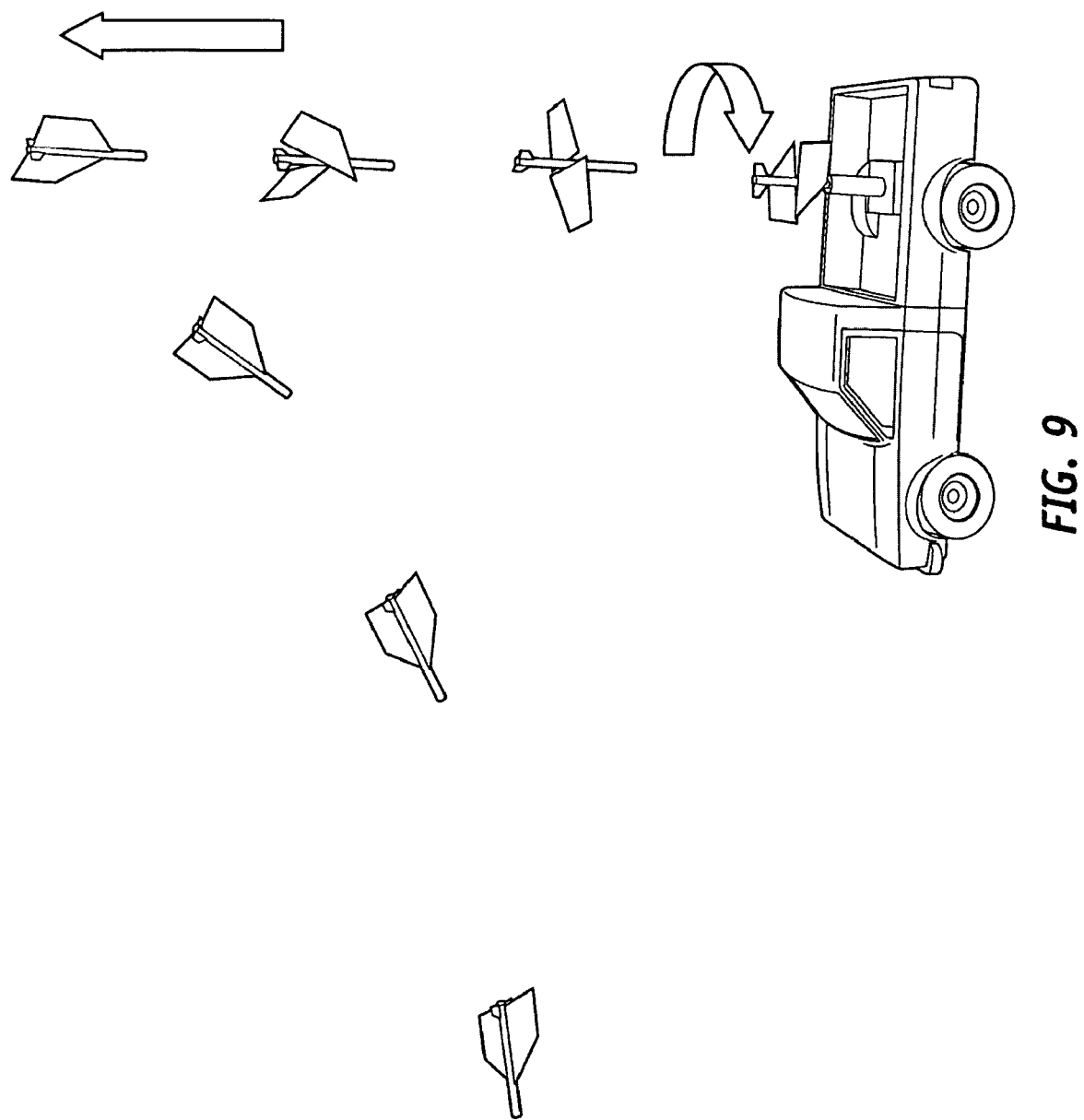
FIG. 9 illustrates a launch sequence.

Referring now to FIGS. 8 and 9, in operation, the UAV 100 may be initially launched by positioning the lifting surfaces 104 to generate rotational lift and rotating the body 102. For example, the UAV 10 may be coupled to the launch system 702. The UAV 100 lifting surfaces 104 are rotated to a selected angle relative to the longitudinal axis of the body 102 of the UAV 100 to generate lift. The launch system 702 is then activated and the UAV 100 is rotated about its longitudinal axis. As the rate of rotation increases, so does the amount of lift generated by the lifting surfaces 104 until the amount of lift exceeds the weight of the UAV 100. At this point, the UAV 100 may be released and begin to "lift" up and away from the launch system 702.

After the UAV 100 lifts away from the launch system 702, the rate of rotation of the UAV 100 begins to decrease and the amount of lift generated by the lifting surfaces 104 also decreases. At some point, the weight of the UAV 100 exceeds the amount of lift generated by the spinning body 102 and the UAV 100 begins to descend. The control system may signal the propulsion system 106 to initiate operation, while also signaling the lifting surfaces 104 to rotate to a position where the leading edge 108 on each of the lifting surfaces 104 faces the same direction, transforming the UAV 100 from a gyroscopic aircraft into a fixed-wing aircraft positioned in a dive.

As the UAV 100 descends, it gains airspeed due to gravity and the activated propulsion system 106, allowing the UAV 100 to pull out of the dive and transition into forward fixed-wing flight. The UAV 100 may then perform a predetermined mission, such as surveillance or target engagement. At the completion of the mission, the UAV 100 may fly to another location for recovery.

Figure 10:
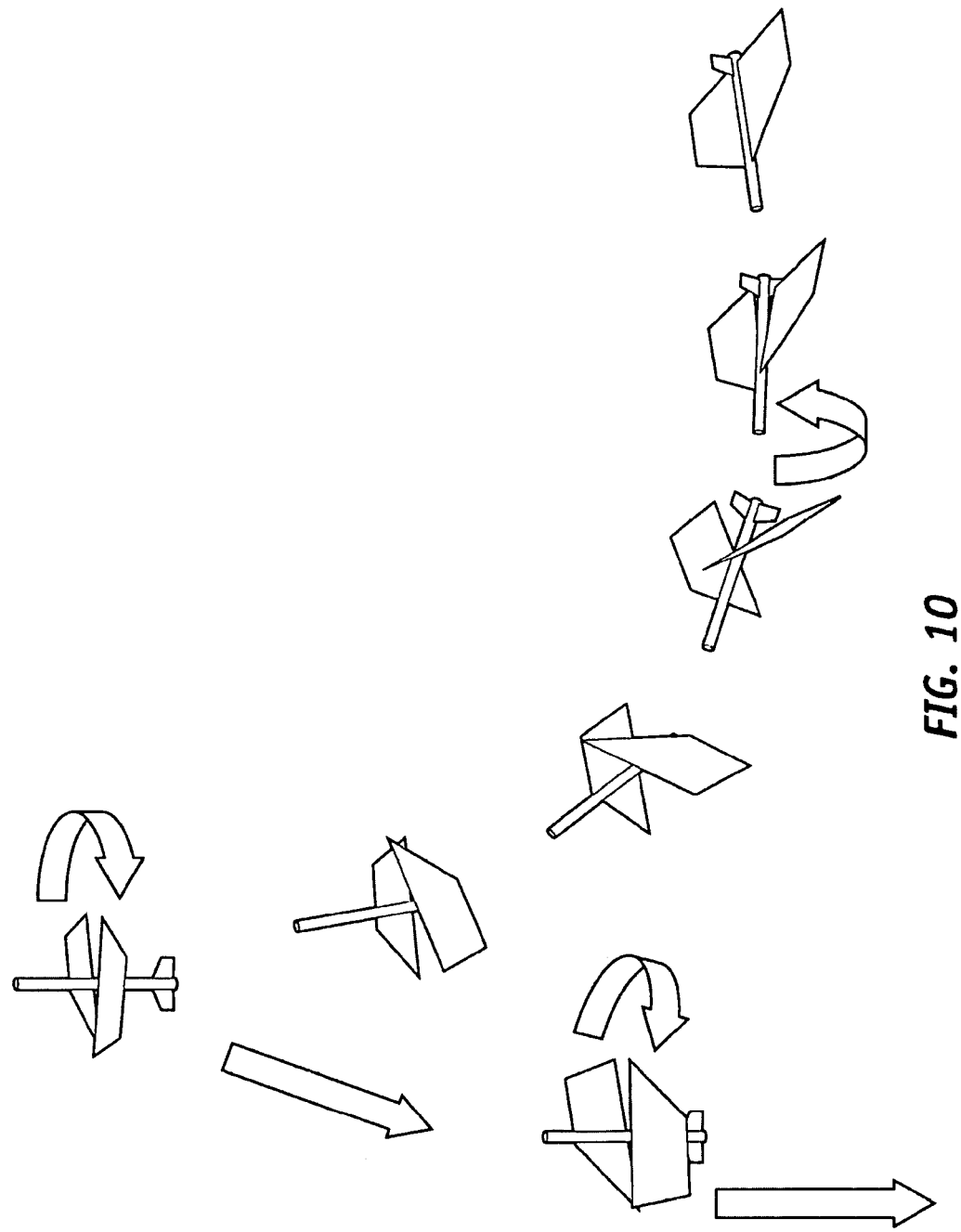
FIG. 10 illustrates a landing sequence.

In some instances, there may not be adequate area for the UAV 100 to land in a fixed-wing configuration. The UAV 100 may land as an auto gyro by placing the body 102 in at least a substantially vertical position and rotating the lifting surfaces 104. For example, the UAV 100 may enter a dive and rotate the lifting surfaces 104 substantially perpendicular to the body 102 to slow the rate of descent. Referring now to FIG. 10, in an alternative embodiment, the UAV 100 may pitch upwards to a stall position and enter a downward tail slide. The UAV 100 may also roll as it pitches upward, inducing a spin to the body 102 along its longitudinal axis. During the climb or after the tail slide is initiated, the control system may signal the lifting surfaces 104 to rotate to a position that generates enough lift to control the rate of descent of the UAV 100.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation as used in this description are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An aircraft, comprising:
a fuselage comprising a forward end and an aft end;
a first lifting surface with a first leading edge, wherein the first lifting surface is rotatably connected to the fuselage;
a second lifting surface with a second leading edge, wherein the second lifting surface is rotatably connected to the fuselage; wherein
the first and second lifting surfaces are configured to:
rotate prior to at least one of takeoff and landing such that each of the first and second leading edges forms an angle of between thirty and one hundred fifty degrees relative to a longitudinal axis of the fuselage when the fuselage is disposed in a substantially vertical position; and
rotate after takeoff such that each of the first and second leading edges is positioned toward the forward end of the fuselage;
wherein the fuselage is configured to engage a launch system adapted to rotate the fuselage about its longitudinal axis prior to launch.

2. An aircraft according to claim 1, wherein the first lifting surface and the second lifting surface form a delta wing when the first and second leading edges are positioned toward the forward end of the fuselage.

3. An aircraft according to claim 1, wherein the first lifting surface and the second lifting surface rotate in opposite directions relative to each other.

4. An aircraft according to claim 1, wherein the first leading edge and the second leading edge face substantially opposite directions during at least one of takeoff and landing.

5. An aircraft according to claim 1, wherein the launch system is mounted on a mobile entity.

6. An aircraft according to claim 1, further comprising a propulsion system, wherein the propulsion system comprises at least one propulsive element connected to each of the first lifting and second lifting surfaces.

7. An unmanned aircraft, comprising:
a fuselage comprising a forward end and an aft end; and
at least two wings rotatably connected to the fuselage, wherein:
each of the at least two wings comprises a leading edge; and
each of the at least two wings is configured to:
rotate prior to takeoff such that each of the first and second leading edges forms an angle between thirty and one hundred fifty degrees relative to a longitudinal axis of the fuselage when the fuselage is disposed in a substantially vertical position; and
rotate after takeoff such that each of the first and second leading edges is positioned toward the forward end of the fuselage;
wherein the fuselage is configured to engage a launch system adapted to rotate the fuselage about its longitudinal axis prior to launch.

8. An unmanned aircraft according to claim 7, wherein the at least two wings are configured to rotate prior to landing such that each of the leading edges forms an angle of between thirty and one hundred fifty degrees relative to the longitudinal axis of the fuselage.

9. An unmanned aircraft according to claim 7, wherein the at least two wings form a delta wing aircraft when the two leading edges are positioned forward the forward end of the fuselage.

10. An unmanned aircraft according to claim 6, wherein the at least two wings are configured to rotate in opposite directions relative to each other.

11. An unmanned aircraft according to claim 7, wherein the two leading edges face substantially opposite directions from each other during at least one of takeoff and landing.

12. An unmanned aircraft according to claim 7, wherein the launch system is mounted on a mobile entity.

13. An unmanned aircraft according to claim 8, further comprising a propulsion system, wherein the propulsion system comprises at least one propulsive element connected to each of the first lifting and second lifting surfaces.

* * * * *